United States Patent [19]

Kuze

[11] Patent Number: 5,096,108
[45] Date of Patent: Mar. 17, 1992

[54] APPARATUS FOR STRIPPING MOLDED RUBBER PRODUCTS FROM A PRODUCT SHEET

[76] Inventor: Yoshikazu Kuze, 31-3, Higashimagome 1-chome, Ohta-ku, Tokyo, Japan

[21] Appl. No.: 566,512

[22] Filed: Aug. 13, 1990

[30] Foreign Application Priority Data

Aug. 17, 1989 [JP] Japan .................................. 1-210768

[51] Int. Cl.⁵ .............................................. B26F 3/00
[52] U.S. Cl. ............................................ 225/97; 83/133;
83/410.7; 83/412; 83/451; 83/620; 83/945;
225/103
[58] Field of Search ................... 83/32, 133, 139, 140,
83/279, 410.7, 410.8, 410.9, 411.7, 412, 423,
451, 618, 620, 639.1, 639.5, 685, 687, 691, 945;
225/97, 105, 103

[56] References Cited

U.S. PATENT DOCUMENTS 4,015,495 4/1977 Yerly ............................... 225/97 X
4,253,364 3/1981 Kiefer et al. ....................... 83/620 X
4,730,761 3/1988 Spano ............................... 83/451 X
4,892,242 1/1990 Tanida et al. ........................ 225/2

Primary Examiner—Mark Rosenbaum
Assistant Examiner—Eugenia A. Jones
Attorney, Agent, or Firm—Beveridge, DeGrandi & Weilacher

[57] ABSTRACT

An apparatus has a base plate having a plurality of penetrating holes, a vertically movable plate slidably mounted on guide posts, and a stripper plate slidably mounted on the guide posts and hung from the movable plate. A plurality of stripper pins are vertically slidably mounted in the stripper plate. Each stripper pin is arranged to be inserted in corresponding one of the penetrating holes of the base plate. A sheet holding plate for mounting a product sheet is provided to be detachably mounted on the base plate. The stripper pins are arranged to push each molded rubber product on the product sheet in the corresponding penetrating hole so as to strip it from the product sheet.

6 Claims, 8 Drawing Sheets

APPARATUS FOR STRIPPING MOLDED RUBBER PRODUCTS FROM A PRODUCT SHEET

BACKGROUND OF THE INVENTION

The present invention relates to an apparatus for stripping a plurality of molded rubber products from a product sheet, which are molded together with the sheet.

Generally, a plurality of small rubber pieces, for example 200-400 pieces, are molded at the same time together with connecting branches which connect these pieces to form a product sheet. These pieces are stripped from the product sheet, thereby producing finished rubber products.

To strip the molded rubber products, the product sheet is mounted in a stripping machine by hand. It is difficult and dangerous to mount the molded product sheet in the stripping machine, because the product sheet is thin and the vertical gap for mounting the sheet is very small.

SUMMARY OF THE INVENTION

The object of the present invention is to provide an apparatus which may automatically strip a plurality of rubber products.

According to the present invent-on, there is provided an apparatus for stripping molded rubber products from a product sheet comprising. a base plate having a plurality of penetrating holes corresponding to the molded rubber products in the product sheet, vertical guide posts securely mounted on the base plate, a cylinder plate securely mounted on top portions of the guide posts, a hydraulic pressure cylinder and a hydraulic stripper cylinder vertically mounted on the cylinder plate, a movable plate slidably mounted on the guide posts and connected to a piston rod downwardly extending from the pressure cylinder so as to be moved along the guide posts, a stripper plate slidably mounted on the guide posts and operatively connected with the movable plate so as to be hung from the movable plate, a plurality of stripper pins vertically slidably mounted in the stripper plate, each of the stripper pins being arranged to be inserted in corresponding one of the penetrating holes of the base plate, a slidable plate mounted on the stripper plate so as to downwardly project the stripper pins, guide means for vertically slidably holding the slidable plate, a sheet holding plate detachably mounted on the base plate, holding means mounted on the sheet holding plate for holding the product sheet, lifters provided on the base plate, each having a spring loaded upwardly projected pin for holding the sheet holding plate holding the product sheet by the holding means.

The stripper plate is arranged to press the sheet holding plate against the base plate against the spring loaded pins of the lifters so as to press the product sheet held on the sheet holding plate against the base plate by the operation of the pressure cylinder, and the stripper pins are arranged to push each molded rubber product in the corresponding penetrating hole so as to strip it from the product sheet by the operation of the stripper cylinder through the slidable plate.

In an aspect of the invention, the guide means is a guide frame secured to the movable plate and slidably mounted on the guide posts, and the holding means are plurality of holding pins secured to the sheet holding plate each of which is provided so as to be engaged with one of the product rubber.

The apparatus further comprises a sheet holding plate feeder for feeding the sheet holding plate holding the product sheet in the stripper apparatus and for removing the sheet holding plate from the apparatus after the stripping operation.

These and other objects and features of the present invention will become more apparent from the following detailed description with reference to the accompanying drawings.

DETAILED DESCRIPTION OF THE PREFERRED EMBODIMENT

Figure 1A:
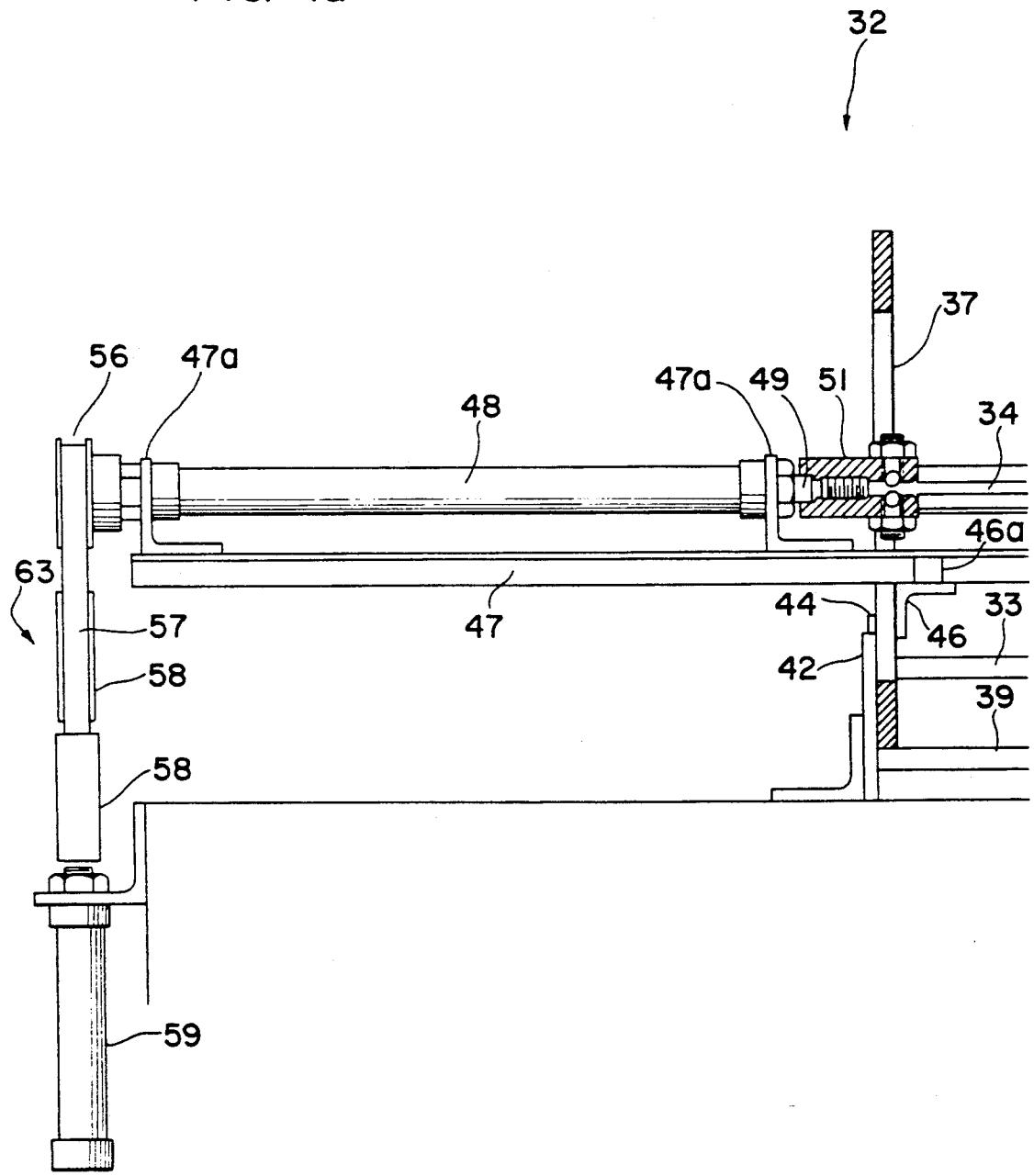
FIGS. 1a and 1b are front elevations showing a stripping apparatus according to the present invention.
Figure 1B:
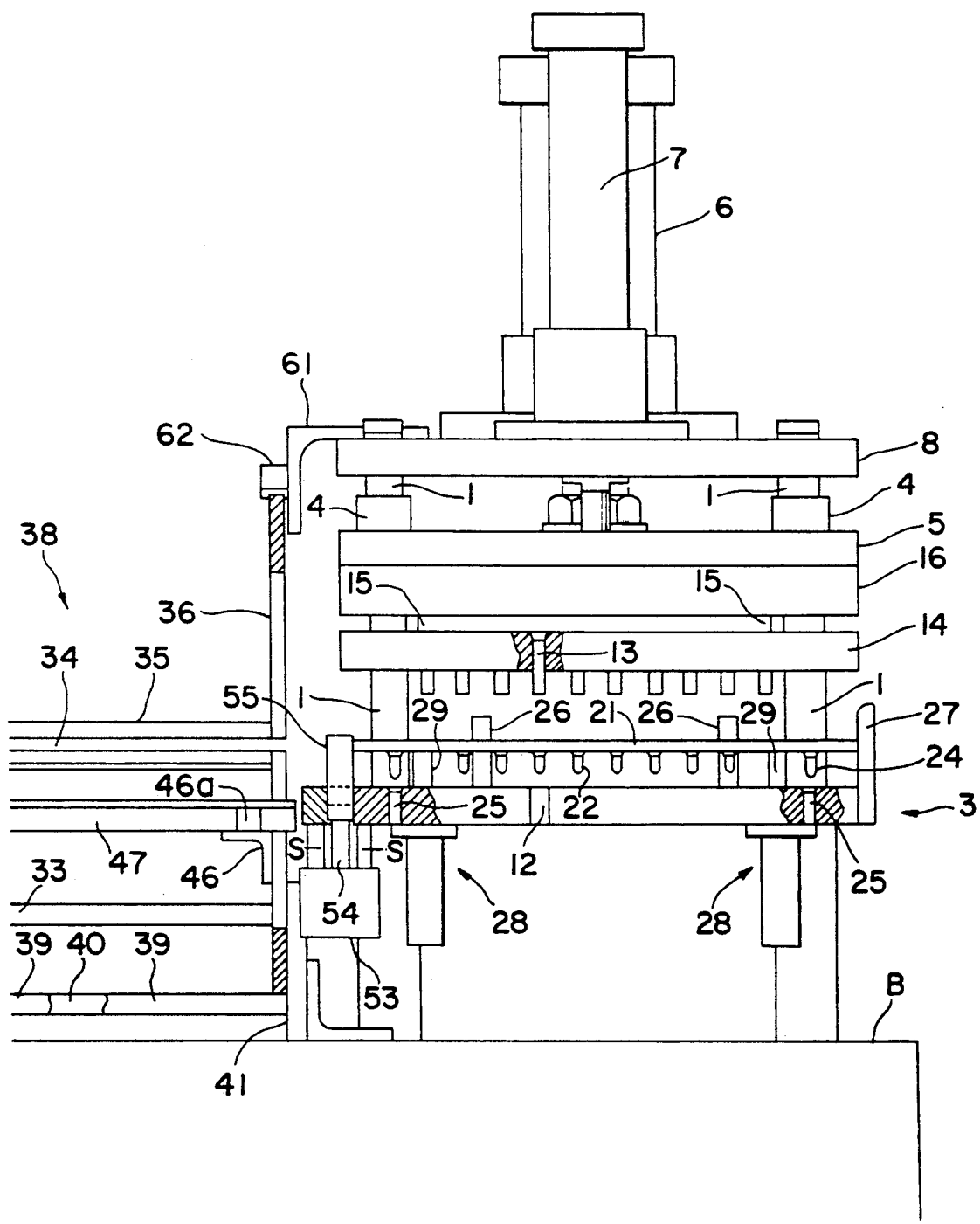
Figure 2:
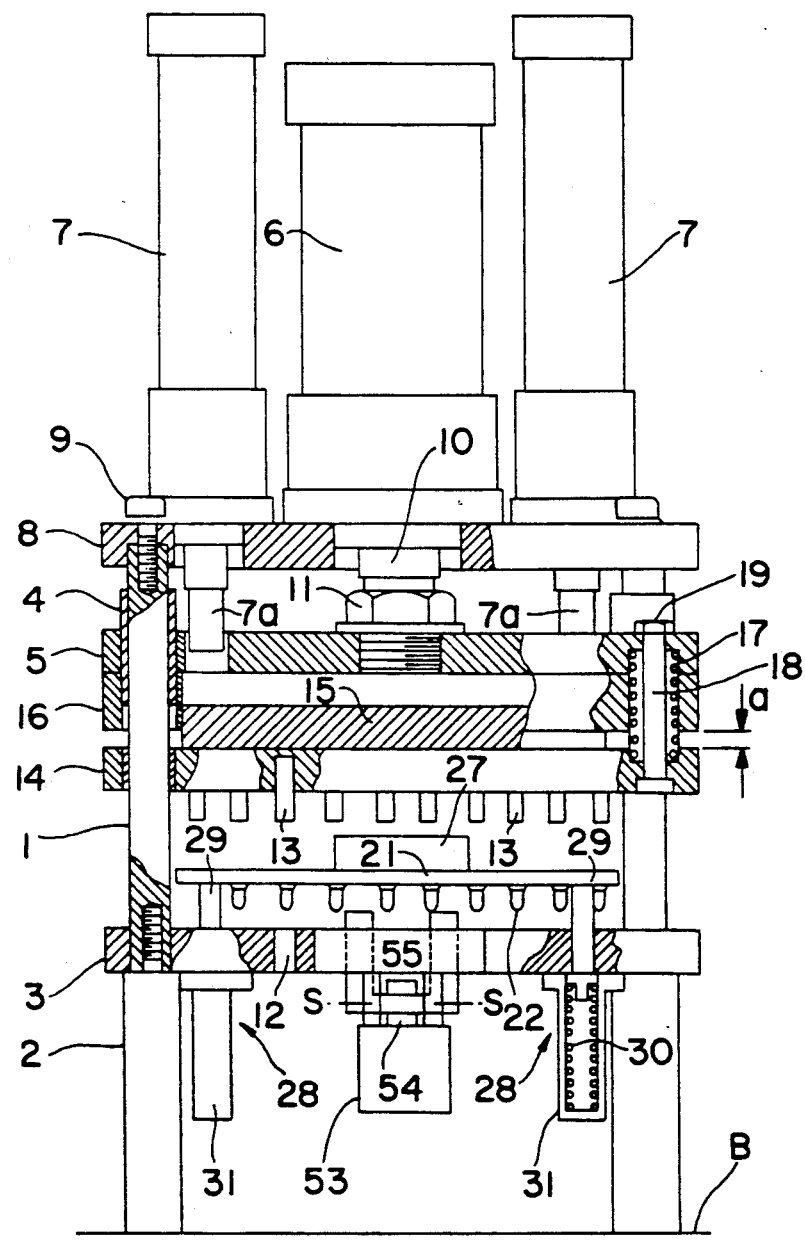
FIG. 2 is a side view of the apparatus as viewed from the right of FIG. 1.

Referring to FIGS. 1 and 2, two vertical guide posts 1 are securely mounted on a base plate 3 having legs 2 which are mounted on a base B. A movable plate 5 is slidably mounted on the guide posts 1 by slidably engaging a guide bush 4 with each guide post 1. A horizontal cylinder plate 8 is secured to the guide post 1 at the top of each post and secured thereto by a screw 9. A pressure cylinder 6 such as an oil hydraulic cylinder and a pair of stripper cylinders 7 are vertically mounted on the cylinder plate 8. A piston 10 of the cylinder 6 has a screw thread. The piston rod 10 is secured to the movable plate 5 by engaging the screw thread in the movable plate and locked by a lock nut 11. A guide frame 16 in the form of a rectangular frame is secured to the underside of the movable plate 5 and slidably mounted on the guide posts 1. In the guide frame, a slidable plate 15 is vertically slidably supported and mounted on a stripper plate 14. The stripper plate 14 is slidably mounted on the guide posts 1 and hung from the movable plate 5 by bolts 18 and nuts 19 and downwardly urged by springs 17 each of which is disposed between the movable plate and the stripper plate 14, so that a lift a is provided for the stripper plate 14. A plurality of stripper pins 13 are axially slidably mounted in the stripper plate 14. Each stripper pin 13 has a flange at the top thereof, thereby preventing the pin from falling. The stripper pins are disposed corresponding to molded rubber products integral with connecting branches which will be described hereinafter. On the other hand, the base plate 3 has a plurality of penetrating holes 12 corresponding to the stripper pins 13. On the upper surface of the base plate 3, an annular recess 65 is formed around each hole 12, leaving a land 64. A piston 7a of each stripper cylinder 7 is adapted to be abutted on the slidable plate 15 passing through a hole 5a of the movable plate 5, thereby downwardly moving the slidable plate 15 and stripper plate 14.

Figure 3:
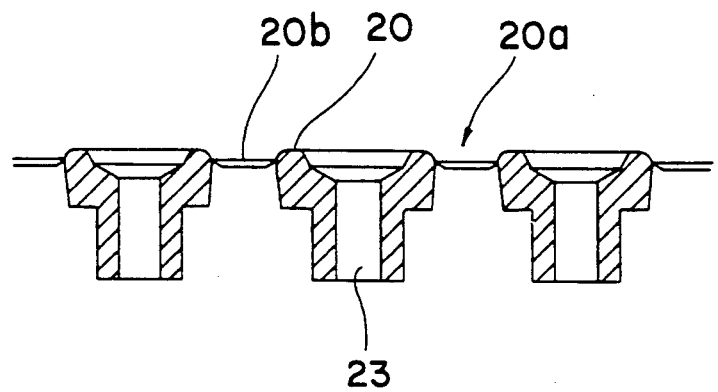
FIG. 3 is a sectional view showing a part of a molded product sheet.

FIG. 3 shows a part of a molded rubber sheet 20a. The sheet comprises a plurality of molded rubber products 20 (for example 96 pieces) each having a hole 23, and connecting branches 20b.

Figure 4:
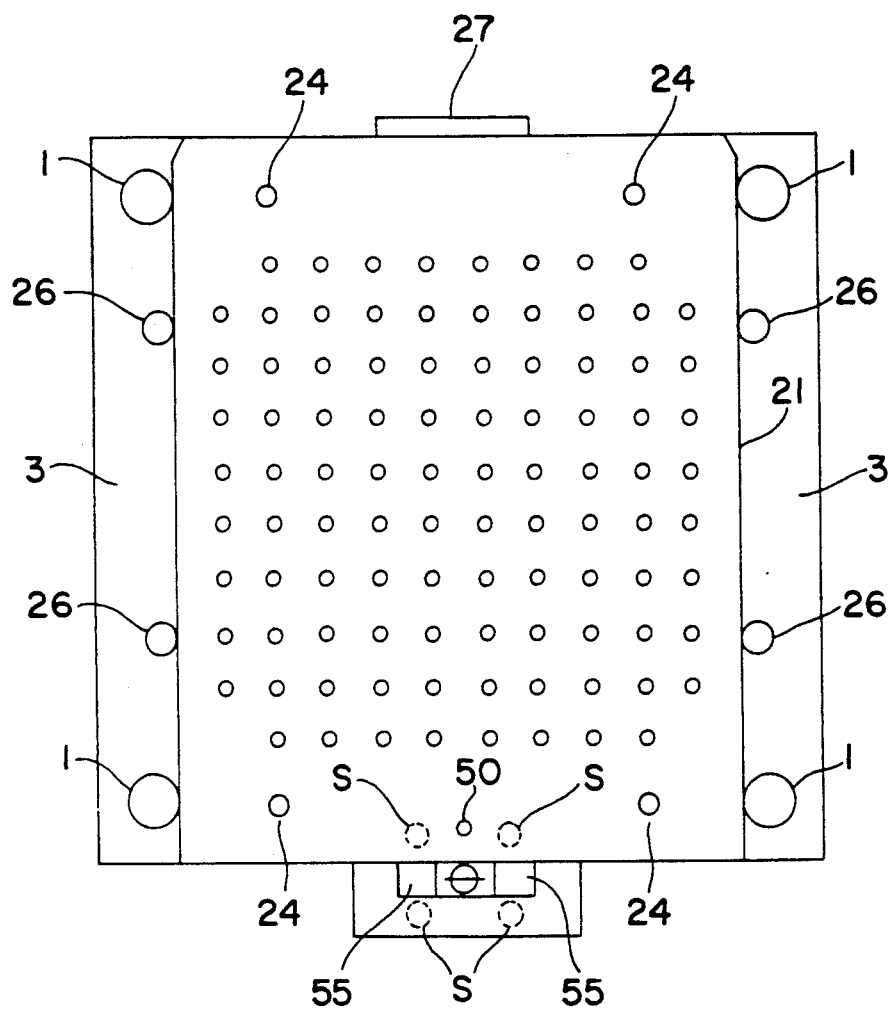
FIG. 4 is a plan view showing a sheet holding plate.
Figure 5:
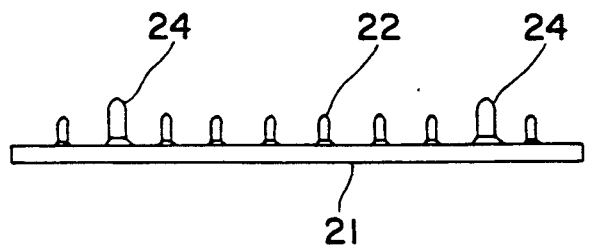
FIG. 5 is a side view of the sheet holding plate.
Figure 7:
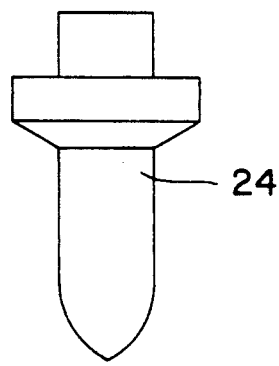
FIG. 7 shows a locating pin to be secured to the sheet holding plate.
Figure 6:
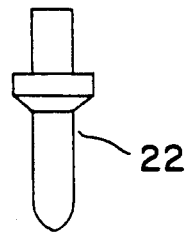
FIG. 6 shows a holding pin to be mounted on the sheet holding plate.

FIGS. 4 and 5 show a sheet holding plate 21. A plurality of holding pins 22 are securely mounted on the plate 21, disposed corresponding to the molded rubber products 20 so as to be engaged with corresponding holes 23. The sheet holding plate 21 has four locating pins 24 which are to be engaged with holes 25 formed in the base plate 3.

On the other hand, the base plate 3 has six opposite locating pins 26 for determining the lateral position of the sheet holding plate 21, and a stopper plate 27 for the longitudinal position of the plate 21. Furthermore, four lifters 28 are provided on the base plate 3. Each lifter 28 comprises a cylinder 31 secured to the underside of the base plate 3, an upwardly projected pin 29 slidably mounted in the cylinder 31 and a spring 30 for upwardly projecting the pin 29. On the underside of the base plate 3, an air cylinder 53 is secured. A pair of stopper pins 55 are slidably mounted in the base plate 3 and connected to a piston rod 54 of the hydraulic cylinder 53 through connecting members S as shown in FIG. 2.

Figure 10:
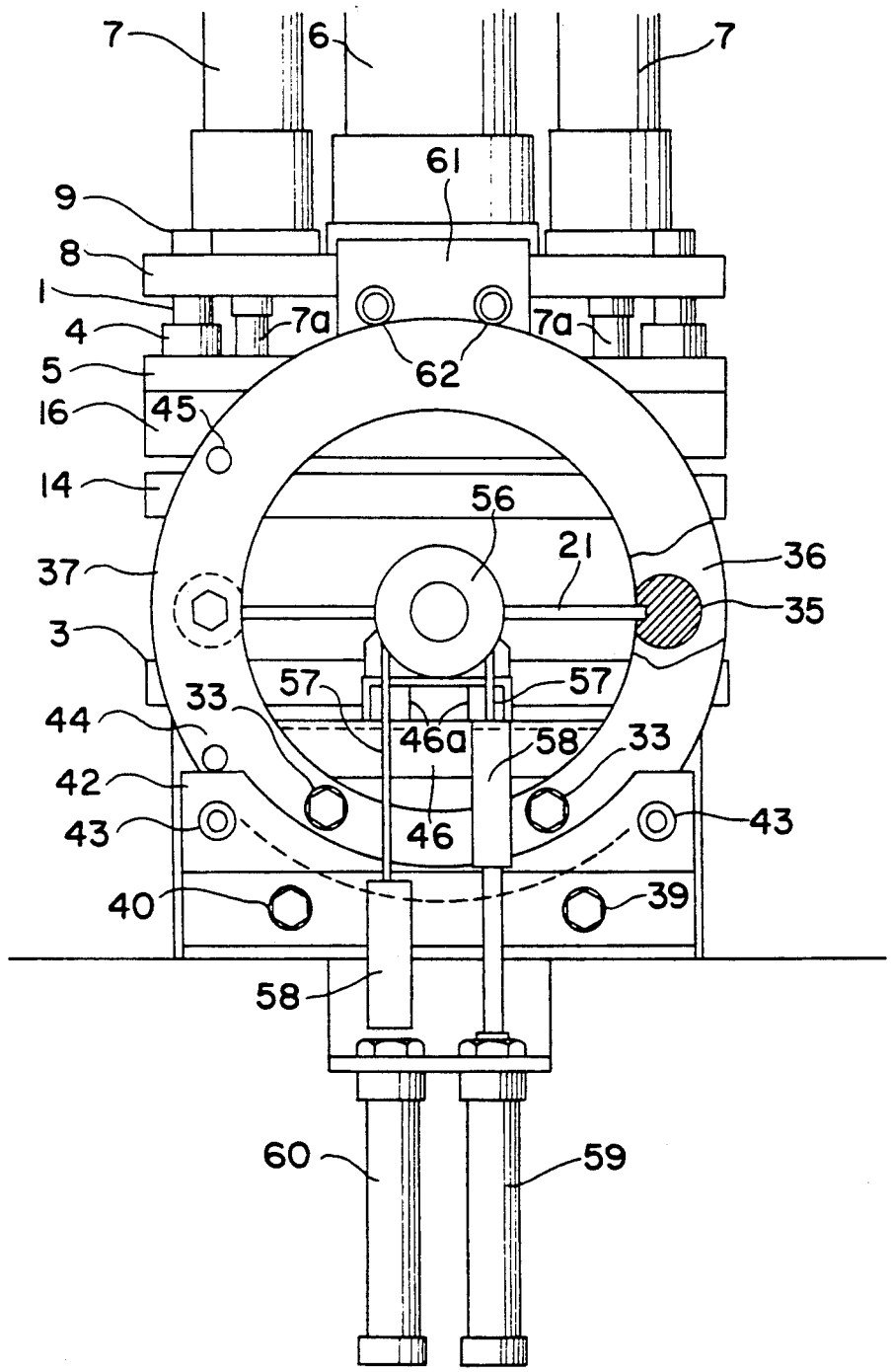
FIG. 10 is a side view of the apparatus as viewed from the left of FIG. 1.

Referring to FIGS. 1 and 10, a sheet holding plate feeder 32 is provided adjacent the stripping apparatus. The feeder 32 comprises a rotating drum 38, a feeder cylinder 48 and an inverting device 63. The rotating drum 38 comprises a pair of ring plates 36 and 37, a diametrically opposite guide rails 35 and a pair of rails 33, each of which is secured to both ring plates 36, 37 and both ends thereof. Both the ring plates 36 and 37 are rotatably mounted on rollers 43 provided on a pair of supporting plates 41 and 42 which are securely mounted on the bed B and connected each other by rails 39 and 40. A pair of rollers 62 are provided on a bracket 61 secured to the plate 8 for supporting the ring plate 36. Each guide rail 35 has a guide groove 34 for receiving the sheet holding plate 21. The ring plate 37 has opposite stopper pins 44 and 45 each of which abuts on the top of the supporting plate 42 at the corresponding horizontal position of the sheet holding plate 21.

Figure 11:
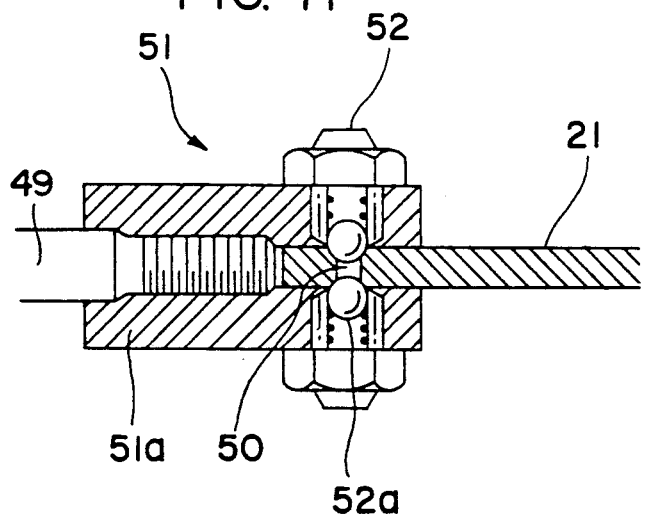
FIG. 11 is a sectional view showing a clamping device for the sheet holding plate.

On the supporting plate 41 and 42, a supporting rail 47 is securely mounted through brackets 46, interposing blocks 46a. The supporting rails 47 outwardly extend. On the extended portion, the feeder cylinder 48 is rotatably mounted on brackets 47a secured to the supporting rails 47. The clamping device 51 is secured to the end of the piston rod 49 of the feeder cylinder 48. As shown in FIG. 11, the clamping device 51 comprises a pair of cylindrical screws 52 engaged in a holder 51a which is secured to the piston rod 49 and a pair of spring loaded opposite balls 52a. The balls are arranged to engage with a connecting hole 50 of the sheet holding plate 21, so that the plate may be moved by the piston 49. The inverting device 63 comprises a pulley 56 secured to the end of the feeder cylinder 48, and a timing belt 57 engaged with the pulley 56. A pair of hydraulic cylinders 59 and 60 are attached to the base B. The both ends of the timing belt 57 are connected to pistons of the cylinders 59 and 60 through connectors 58.

Figure 8:
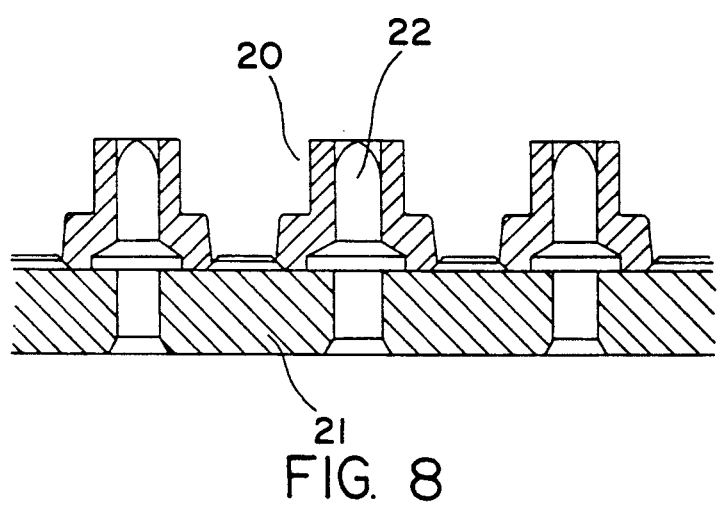
FIG. 8 is a sectional view showing the product sheet mounted on the sheet holding plate.
Figure 9:
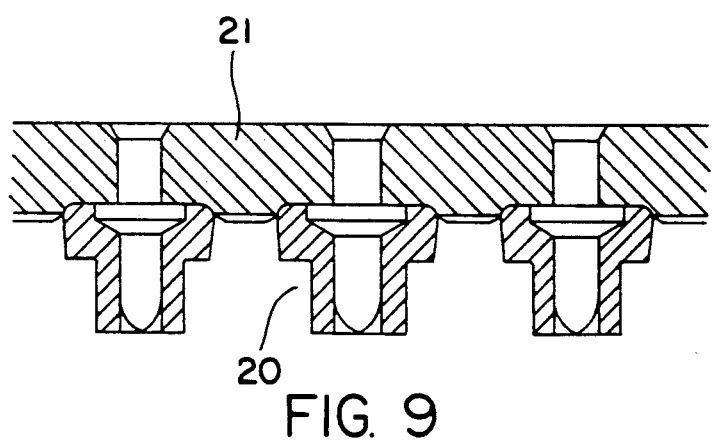
FIG. 9 shows the product sheet of FIG. 8 inverted 180 degrees.

The operation of the apparatus is described hereinafter. The stopper pins 55 are lowered by the cylinder 53 and the sheet holding plate 21 is drawn out in the rails 34 by the piston rod 49 through the clamping device 51. The plate 21 is rotated 180 degrees together with the rotating drum 38 through the cylinder 48 by the inverting device 63. The molded rubber sheet 20a is mounted on the sheet holding plate 21, engaging each molded rubber product 20 with the corresponding pin 22 (FIG. 8). The sheet holding plate 21 is inverted by the inverting device 63 (FIG. 9). The plate 21 is advanced by the piston 49 and stopped by the stopper plate 27. Thereafter, the stopper pins 55 are projected adjacent the rear end of the plate 21, and then the piston 49 is retracted. At that time, the plate 21 is stopped by the stopper pins 55 and balls 52a of the clamping device 51 remove from the hole 50 of the plate 21.

Figure 12:
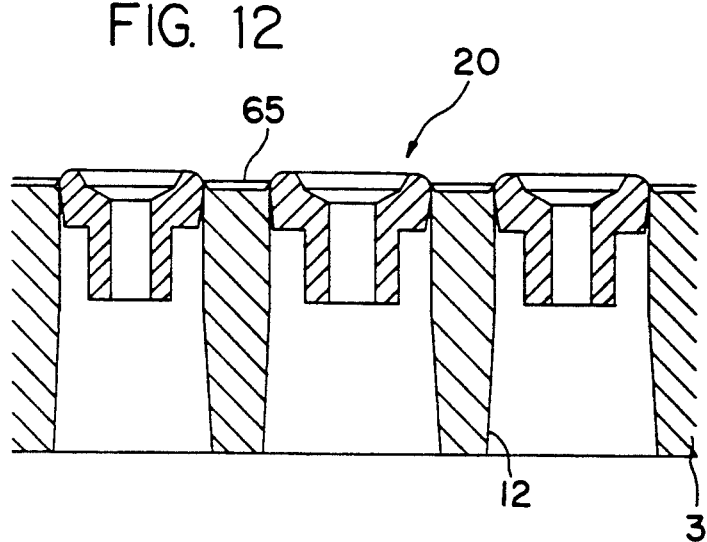
FIG. 12 is a sectional view of a base plate in which the molded product sheet is engaged.
Figure 13:
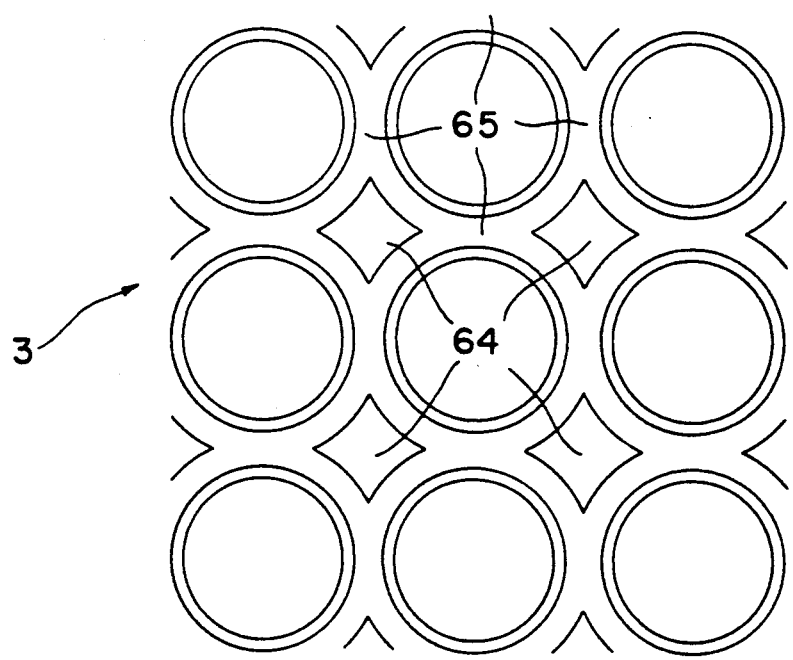
FIG. 13 is a plan view of the base plate.

After that, the movable plate 5 is lowered by the cylinder 6 so that the slidable plate 15 and the stripper plate 14 descend together with the movable plate 5. When the stripper pins 13 abut on the sheet holding plate 21, the holding plate 21 is lowered against the spring 30 of the lifter 28, engaging the pins 24 with the holes 25 of the base plate 3. Thus, the molded products 20 are engaged with the holes 12 of the base plate 3, respectively. Then, the movable plate 5 is raised by the cylinder 6 together with the slidable disk 15 and the stripper plate 14. When the stripper plate 14 ascends, the sheet holding plate 21 is raised by the pins 29 of the lifter 28, leaving the rubber sheet 20a on the base plate 3 (FIG. 12).

The stopper pins 55 are lowered by the air cylinder 53, and the piston rod 49 of the feeder cylinder 48 is advanced to grip the holding plate 21 with the clamping device 51. The piston rod 49 is retracted to remove the plate 21 from the stripping apparatus.

The movable plate 5 is lowered again, so that the rubber sheet 20a is pushed against the base plate 3 by the stripper plate 14. Thereafter, the cylinders 7 are operated to lower the respective rods 7a to lower the slidable plate 15. Thus, the stripper pins 13 are lowered, so that the molded products 20 engaged with the holes 12 are pushed by the pins. As a result, the molded products are cut off the branches 20b, and downwardly ejected from the base plate. Thus, finished products are produced, and then the piston rods 7a are raised and the movable plate 5, stripper plate 14, and slidable plate 15 are raised by the cylinder 6 to return the initial position shown in FIG. 2.

From the foregoing, it will be under stood that the present invention provides a stripping apparatus which automatically strip a plurality of rubber products.

While the invention has been described in conjunction with preferred specific embodiment thereof, it will be understood that this description is intended to illustrate and not limit the scope of the invention, which is defined by the following claims.

What is claimed is

1. An apparatus for stripping molded rubber products from a product sheet comprising:
   a base plate having a plurality of penetrating holes corresponding to said molded rubber products in said product sheet;
   vertical guide posts securely mounted on said base plate;

a cylinder plate securely mounted on top portions of said guide posts;

a hydraulic pressure cylinder and a hydraulic stripper cylinder vertically mounted on said cylinder plate;

a movable plate slidably mounted on said guide posts and connected to a piston rod downwardly extending from said pressure cylinder so as to be moved along the guide posts;

a stripper plate slidably mounted on said guide posts and operatively connected with said movable plate so as to be hung from the movable plate;

a plurality of stripper pins vertically slidably mounted in said stripper plate, each of the stripper pins being arranged to be inserted in a corresponding one of said penetrating holes of said base plate;

a slidable plate mounted on said stripper plate so as to downwardly project said stripper pins;

guide means for vertically slidably holding said slidable plate;

a sheet holding plate detachably mounted on said base plate;

holding means mounted on said sheet holding plate for holding said product sheet;

lifters provided on said base plate, each having a spring loaded upwardly projected pin for holding said sheet holding plate holding said product sheet by said holding means;

said stripper plate being arranged to press said sheet holding plate against said base plate against said spring loaded pins of said lifters so as to press said product sheet held on said sheet holding plate against said base plate by the operation of said pressure cylinder;

said stripper pins being arranged to push each molded rubber product in the corresponding penetrating hole so as to strip it from said product sheet by the operation of said stripper cylinder through said slidable plate.

2. The apparatus according to claim 1 wherein said guide means is a guide frame secured to said movable plate and slidably mounted on said guide posts.

3. The apparatus according to claim 1 wherein said holding means are a plurality of holding pins secured to said sheet holding plate each of which is provided so as to be engaged with one of the rubber products.

4. The apparatus according to claim 1 further comprising a sheet holding plate feeder for feeding the sheet holding plate holding the product sheet in the stripper apparatus and for removing the sheet holding plate from the apparatus after the stripping operation.

5. The apparatus according to claim 4 wherein said sheet holding plate feeder comprises a rotating drum for supporting the sheet holding plate, a feeder cylinder mounted to be rotated about the axis thereof and provided for feeding the sheet holding plate supported in said drum to said stripper apparatus and for removing it from the apparatus, and an inverting device for rotating the drum 180 degrees so as to invert the sheet holding plate.

6. The apparatus according to claim 5 wherein said inverting device comprises a pulley secured to an end of the feeder cylinder, a timing belt engaged with the pulley and a pair of cylinders for reciprocating the timing belt.

* * * * *